(12) United States Patent
Majumdar et al.

(10) Patent No.: US 7,365,104 B2
(45) Date of Patent: Apr. 29, 2008

(54) LIGHT CURABLE ARTICLES CONTAINING AZINIUM SALTS

(75) Inventors: Debasis Majumdar, Rochester, NY (US); Deepak Shukla, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 394 days.

(21) Appl. No.: 11/096,093

(22) Filed: Mar. 31, 2005

(65) Prior Publication Data

US 2006/0223902 A1 Oct. 5, 2006

(51) Int. Cl.
C08F 2/46 (2006.01)
G03C 8/24 (2006.01)

(52) U.S. Cl. .............. 522/63; 522/83; 522/84

(58) Field of Classification Search .......... 522/84, 522/85, 26, 63, 83
See application file for complete search history.

(56) References Cited

U.S. PATENT DOCUMENTS

| | | | |
|---|---|---|---|
| 4,026,705 A | 5/1977 | Crivello et al. | |
| 4,250,053 A | 2/1981 | Smith | |
| 4,339,567 A | 7/1982 | Green et al. | |
| 4,398,014 A | 8/1983 | Green et al. | |
| 4,708,925 A | 11/1987 | Newman | |
| 4,739,007 A | 4/1988 | Okada et al. | |
| 4,810,734 A | 3/1989 | Kawasumi et al. | |
| 4,894,411 A | 1/1990 | Okada et al. | |
| 5,102,948 A | 4/1992 | Deguchi et al. | |
| 5,164,440 A | 11/1992 | Deguchi et al. | |
| 5,164,460 A | 11/1992 | Yano et al. | |
| 5,248,720 A | 9/1993 | Deguchi et al. | |
| 5,506,326 A | 4/1996 | Kneafsey | |
| 5,567,858 A | 10/1996 | Crivello | |
| 5,686,503 A | 11/1997 | Nohr et al. | |
| 5,804,613 A | 9/1998 | Beall et al. | |
| 5,854,326 A | 12/1998 | Sakaya et al. | |
| 5,880,197 A | 3/1999 | Beall et al. | |
| 6,008,268 A | 12/1999 | Nohr et al. | |
| 6,034,163 A | 3/2000 | Barbee et al. | |
| 6,242,057 B1 | 6/2001 | Nohr et al. | |
| 6,376,163 B1 * | 4/2002 | Goswami et al. | 430/559 |
| 6,436,624 B2 * | 8/2002 | Farid et al. | 430/564 |
| 6,610,759 B1 | 8/2003 | Chappelow et al. | |
| 6,767,951 B2 | 7/2004 | Nair et al. | |
| 6,767,952 B2 | 7/2004 | Dontula et al. | |
| 6,946,240 B2 * | 9/2005 | Rao et al. | 430/531 |
| 2003/0100656 A1 | 5/2003 | Majumdar et al. | |
| 2004/0042750 A1 | 3/2004 | Gillberg et al. | |
| 2005/0070655 A1 * | 3/2005 | Van Den Bergen et al. | 524/445 |
| 2006/0223919 A1 * | 10/2006 | Majumdar et al. | 524/99 |

FOREIGN PATENT DOCUMENTS

| | | |
|---|---|---|
| EP | 0044272 A2 | 1/1982 |
| EP | 0035969 B1 | 2/1985 |
| EP | 0054509 B1 | 4/1986 |
| GB | 2 013 208 A | 8/1979 |
| GB | 2 027 435 A | 2/1980 |
| GB | 2 042 550 A | 9/1980 |
| GB | 2 061 280 A | 5/1981 |
| GB | 02 083 832 A | 3/1982 |

OTHER PUBLICATIONS

A. Okada et al., Polym Prep., 1987, vol. 28, pp. 447-448.
Rachel Levy and C.W. Francis, Journal of Colloid And Interface Science, *Interlayer Adsorption Of Polyvinylpyrrolidone On Montmorillonite*, Mar. 1975, vol. 50 (3), pp. 442-450.
D.J. Greenland, Journal of Colloid Science, *Adsorption Of Poly(vinyl alcohol) By Montmorillonite* vol. 18, 1963, pp. 647-664.
Richard A. Vaia et al., *New Polymer Electrolyte Nanocomposites: Melt intercalation of polyethyleneoxide in mica type silicates*, Advanced Materials, 7(2), 1995, pp. 154-156.
V. Mehrotra, E.P. Giannelis, Solid State Communications, 1991, vol. 77, No. 2, pp. 155-158.

* cited by examiner

*Primary Examiner*—Susan W Berman
(74) *Attorney, Agent, or Firm*—Lynne M. Blank

(57) ABSTRACT

The present invention relates to a light curable material comprising a splayed layered material, at least one aqueous dispersible polymerizer, and at least one aqueous soluble N-oxyazinium compound, wherein the polymerizer polymerizes upon exposure to light. The present invention also includes a method for curing a material comprising providing layered material, splaying the layered material, combining the splayed layered material with a polymerizer and an aqueous soluble N-oxyazinium compound, and subjecting the combination to light for a period of time sufficient to effect the polymerization of the polymerizer.

42 Claims, No Drawings

LIGHT CURABLE ARTICLES CONTAINING AZINIUM SALTS

CROSS REFERENCE TO RELATED APPLICATIONS

Reference is made to commonly assigned, co-pending U.S. patent application Ser. No. 11/095,285 by Majumdar et al. filed of even date herewith entitled "Azinium Salts As Splayant For Layered Materials", the disclosures of which is incorporated herein by reference.

FIELD OF THE INVENTION

The present invention relates to light curable articles comprising a polymerizer and layered material, splayed by an N-oxyazinium compound.

BACKGROUND OF THE INVENTION

Over the last decade or so, the utility of inorganic nanoparticles as additives to enhance polymer performance has been well established. Ever since the seminal work conducted at Toyota Central Research Laboratories, polymer-layered material nanocomposites have generated interest across various industries. The unique physical properties of these nanocomposites have been explored by such varied industrial sectors as the automotive industry, the packaging industry, and plastics manufacturers. These properties include improved mechanical properties, such as elastic modulus and tensile strength, thermal properties such as coefficient of linear thermal expansion and heat distortion temperature, barrier properties, such as oxygen and water vapor transmission rate, flammability resistance, ablation performance, and solvent uptake. Some of the related prior art is illustrated in U.S. Pat. Nos. 4,739,007, 4,810,734, 4,894,411, 5,102,948, 5,164,440, 5,164,460, 5,248,720, 5,854,326, and 6,034,163.

Nanocomposites can be formed by mixing polymeric materials with intercalated layered materials, which have one or more foreign molecules or parts of foreign molecules inserted between platelets of the layered material. Although any amount can be used, the physical property enhancements for these nanocomposites are typically achieved with less than 20 vol. % addition, and usually less than 10 vol. % addition of the inorganic phase, which is typically layered materials or organically modified layered materials. Although these enhancements appear to be a general phenomenon related to the nanoscale dispersion of the inorganic phase, the degree of property enhancement is not universal for all polymers. It has been postulated that the property enhancement is very much dependent on the morphology and degree of dispersion of the inorganic phase in the polymeric matrix.

The layered materials in the polymer-layered material nanocomposites are ideally thought to have three structures: (1) layered material tactoids wherein the layered material particles are in face-to-face aggregation with no organics inserted within the layered material lattice, (2) intercalated layered materials wherein the layered material lattice has been expanded to a thermodynamically defined equilibrium spacing due to the insertion of individual polymer chains, yet maintaining a long range order in the lattice, and (3) exfoliated layered materials wherein singular layered material platelets are randomly suspended in the polymer, resulting from extensive penetration of the polymer into the layered material lattice and its subsequent delamination. The greatest property enhancements of the polymer-layered material nanocomposites are expected with the latter two structures mentioned herein above.

There has been considerable effort towards developing materials and methods for intercalation and/or exfoliation of layered materials and other layered inorganic materials. In addition to intercalation and/or exfoliation, the layered material phase should also be rendered compatible with the polymer matrix in which they are distributed. The challenge in achieving these objectives arises from the fact that unmodified layered material surfaces are hydrophilic, whereas a vast number of thermoplastic polymers of technological importance are hydrophobic in nature. Although intercalation of layered materials with organic molecules can be obtained by various means, compatibilizing these splayed layered materials in a polymer matrix for uniform distribution still poses considerable difficulty. In the industry, the layered material suppliers normally provide just the intercalated layered materials and the end users are challenged to select materials and processes for compatibilizing these layered materials in the thermoplastics of their choice. This selection process involves trial and error at a considerable development cost to the end users. Since layered material intercalation and compatibilization in the matrix polymer usually involve at least two distinct materials, processes, and sites, the overall cost of the product comprising the polymer-layered material nanocomposite suffers.

A vast majority of splayed layered materials are produced by interacting anionic layered materials with cationic surfactants including onium species such as ammonium (primary, secondary, tertiary, and quaternary), phosphonium, or sulfonium derivatives of aliphatic, aromatic or arylaliphatic amines, phosphines and sulfides. These onium ions can cause intercalation in the layered materials through ion exchange with the metal cations present in the layered material lattice for charge balance. However, these surfactant molecules may degrade during subsequent melt processing, placing severe limitation on the processing temperature and the choice of the matrix polymer. If the final product is to be coated out of a solvent-borne phase compatibility of the intercalant with the proper solvent may also impose restrictions on the choice of the intercalant. Additionally, these surfactants can act as lubricants and negatively impact the potential enhancement of properties such as modulus and strength of the nanocomposite.

Intercalation of layered materials with a polymer, as opposed to a low molecular weight surfactant, is also known in the art. There are two major intercalation approaches that are generally used—intercalation of a suitable monomer followed by polymerization (known as in-situ polymerization, see A. Okada et. Al., *Polym Prep.*, Vol. 28, 447, 1987), or monomer/polymer intercalation from solution. Poly(vinyl alcohol) (PVA), polyvinyl pyrrolidone (PVP) and poly(ethylene oxide) (PEO) have been used to intercalate the layered material platelets with marginal success. As described by Levy et al., in "Interlayer adsorption of polyvinylpyrrolidone on montmorillonite", *Journal of Colloid and Interface Science*, Vol 50 (3), 442, 1975, attempts were made to sorb PVP between the monoionic montmorillonite layered material platelets by successive washes with absolute ethanol, and then attempting to sorb the PVP by contacting it with 1% PVP/ethanol/water solutions, with varying amounts of water. Only the Na-montmorillonite expanded beyond 20 Å basal spacing, after contacting with PVP/ethanol/water solution. The work by Greenland, "Adsorption of poly(vinyl alcohol) by montmorrilonite", *Journal of Colloid Science*, Vol. 18, 647-664 (1963) discloses that sorption of PVA on the montmorillonite was dependent on the concentration of PVA in the solution. It was found that sorption was effective only at polymer concentrations of the order of 1% by weight of the polymer. No further effort was made towards commercialization since it would be limited by the drying of the dilute splayed layered materials. In a recent work by Richard Vaia et al., "New Polymer Electrolyte Nanocomposites: Melt intercalation of polyethyleneoxide in mica type silicates", *Adv. Materials*, 7(2), 154-156, 1995, PEO was splayed into Na-montmorillonite and Li-montmorillonite by heating to 80° C. for 2-6 hours to achieve a d-spacing of 17.7° Å. The extent of intercalation observed was identical to that obtained from solution (V. Mehrotra, E. P. Giannelis, *Solid State Commun.*, 77, 155, 1991). Other work (U.S. Pat. No. 5,804,613) has dealt with sorption of monomeric organic compounds having at least one carbonyl functionality selected from a group consisting of carboxylic acids and salts thereof, polycarboxylic acids and salts thereof, aldehydes, ketones and mixtures thereof. Similarly, U.S. Pat. No. 5,880,197 discusses the use of an intercalating monomer that contains an amine or amide functionality or mixtures thereof. In both these patents, and other patents issued to the same group, the intercalation is performed at very dilute layered material concentrations in a medium such as water, leading to a necessary and costly drying step, prior to melt processing.

Recently use of block copolymers has been disclosed in U.S. Pat. Nos. 6,767,951 and 6,767,952 and U.S. Patent Appl. No. 20030100656 A1 for intercalation of smectite clays. In these disclosures intercalation has been reported to have been achieved during melt processing with or without any other intercalating agents. These patents teach of specific block copolymers, which can further compatibilize the clays in various matrix polymers.

Light curable polymeric systems are well known in the art. U.S. Pat. Nos. 5,686,503, 6,008,268, 6,242,057B1 (and references cited there in) describe UV light curing of ethylenically unsaturated oligomer/monomer mixture of polymerizable material using a arylketoalkene sensitizer moiety bonded to a photoinitiator.

A variety of photoinitiator for light curing of ethylenically unsaturated polymerizer materials are known in the art. The largest group of photoinitiators are carbonyl compounds, such as ketones, especially α-aromatic ketones. Examples of a-aromatic ketone photoinitiators include, by way of illustration only, benzophenones; xanthones and thioxanthones; α-ketocoumarins; benzils; α-alkoxydeoxybenzoins; benzil ketals or α,α-dialkoxydeoxybenzoins; enzoyldialkylphosphonates; acetophenones, such as α-hydroxycyclohexyl phenyl ketone, α,α-dimethyl α-hydroxyacetophenone, α-dimethyl-α-morpholino-4-methylthio-α-acetophenone, α-ethyl-α-benzyl-α-dimethylaminoacetophenone, α-ethyl-α-benzyl-α-dimethylamino-4-morpholinoacetophenone, α-ethyl-α-benzyl-α-dimethylamino-3,4dimethoxyacetophenone, α-ethyl-α-benzyl-α-dimethylamino-4-methoxyacetophenone, α-ethyl-α-benzyl-α-dimethylamino-4-dimethylaminoacetophenone, α-ethyl-α-benzyl-α-dimethylamino-4-methylacetophenone, α-ethyl-α-(2-propenyl)-α-dimethylamino-4-morpholinoacetophenone, α,α-bis(2-propenyl)-α-dimethylamino-4-morpholinoacetophenone, α-methyl-α-benzyl-α-dimethylamino-4-morpholinoacetophenone, and α-methyl-α-(2-propenyl)-α-dimethylamino-4-morpholinoaceto-phenone; α,α-dialkoxyacetophenones; α-hydroxyalkylphenones; O acyl-α-oximino ketones; acylphosphine oxides; fluorenones, such as fluorenone, 2-t-butylperoxycarbonyl-9-fluorenone, 4-t-butylperoxyvarbonyl-nitro-9-fluorenone, and 2,7-di-t-butylperoxy-carbonyl-9-fluorenone; and α and β-naphthyl carbonyl compounds.

Other examples of the photoinitiators include, but are not limited to the following: benzoin; benzoin ethyl ether; benzoin isopropyl ether; benzoin n-butyl ether; benzoin butyl ether; benzoin iso-butyl ether; benzildimethyl ketal; 2,2-diethoxy-1,2-diphenylethanone; α,α-diethoxyacetophenone; α,α-di(n-butoxy)acetophenone; 2-hydroxy-2-methyl-1-phenyl-propan-1-one; 1-(4-isopropylphenyl)-2-hydroxy-2-methyl-propan-1-one; 1-(4-(2-hydroxyethoxy)phenyl)-2-hydroxy-2-methyl-propan-1-one; 2-isopropyl thioxanthone; 1-(4-dimethyl-aminophenyl)ethanone; 2-methyl-1-(4-(methylthio)phenyl)-2-morpholino-propan-1-one; 2-benzyl-2-dimethylamino-1-(4-morpholinophenyl)-butan-1-one; 3,6-bis(2-methyl-2-morpholino-propanonyl)-9-butyl-carbazole; 2,4,6-trimethylbenzoyl-diphenyl-phosphine oxide; 2,2,2-trichloro-1-(4-(1,1-dimethylethyl)phenyl)-ethanone; 2,2-dichloro-1-(4-phenoxyphenyl)-ethanone; 4,4'-bis(chloromethyl)-benzophenone; phenyl-tribromomethyl-sulphone; and methyl α-oxo-benzeneacetate. Other free radical generating photoinitiators include, by way of illustration, triarylsilyl peroxides, such as triarylsilyl t-butyl peroxides; acylsilanes; and some organometallic compounds.

A variety of onium salts have been utilized as light initiators in the polymerization of cationically polymerizable materials. British Patent Application Nos. 2,061,280A, 2,042,550A, 2,027,435A, 2,013,208, U.S. Pat. Nos. 4,250,053, 4,708,925, 4,026,705, 5,506,326, 5,567,858 and, 6,610,759B1 and European Patent Application Publication Nos. 54509, 44272, and 35969 disclose catioionically polymerisable composition including onium salts such as diazonium salts, diaryliodonium salts, triarylsulfonium salts, aromatic sulfonyl sulfoxonium salts and carbamoyl sulfoxonium salts.

UK Patent application GB2083832A, incorporated herein by reference, discloses use of amino-substituted photosensitizers with N-oxyazinium compounds as photoinitiator s for compounds containing ethylenic unsaturation.

A number of light curable clay nanocomposite compositions are known in the art. US Patent Application No. 2004/0042750 A1 describes the use of α-aromatic ketone and onium salt photoinitiators in a coating composition. However, the method requires pre-treatment of the clay with a suitable surfactant, like quaternary ammonium salts, surfactant like primary, secondary and tertiary amines, in an aqueous system, filtering the treated clay out followed by drying, before the treated clay can be incorporated in the oligomer. Such a method is time consuming and thus adds cost to the process.

US Patent Application No. 2004/0042750 A1 discloses alkylpyridinium salts of halides, sulfates, nitrates, or methylsulfates as suitable organic substances. Preferably the alkyl group comprises 8 or more carbon groups and the halides are either chloride or bromide.

Thus, a survey of the art, makes it clear that there is a general paucity of prior art on nanocomposites comprising layered materials in light curable matrix. Specifically there is a lack of simple light curable compositions wherein the splayant can also function as a photo-initiator and thus simplifies the coating and curing process. In addition, it is desirable to have multifunctional addenda (viz. splayant and photoinitiator), so that their relative amount in the nanocomposite is small and therefore has minimum deleterious effect, if any, on the properties of the nanocomposite. There is a critical need in the art to identify such addenda. There is also a critical need in the art for a comprehensive strategy for the development of better materials and processes to overcome some of the aforementioned drawbacks.

PROBLEM TO BE SOLVED

There is a need for light curable compositions wherein the splayant can also function as a photoinitiator and thus simplifies the coating and curing process. There remains a need for a multifunctional intercalant for layered materials and for the dispersion of the layered materials in a light curable polymerizer through an environmentally acceptable water or solvent-borne medium to form nanocomposites with desirable properties.

SUMMARY OF THE INVENTION

The present invention relates to a light curable material comprising a splayed layered material, at least one aqueous dispersible polymerizer, and at least one aqueous soluble N-oxyazinium compound, wherein the polymerizer polymerizes upon exposure to light. The present invention also includes a method for curing a material comprising providing layered material, splaying the layered material, combining the splayed layered material with a polymerizer and an aqueous soluble N-oxyazinium compound, and subjecting the combination to light for a period of time sufficient to effect the polymerization of the polymerizer.

ADVANTAGEOUS EFFECT OF THE INVENTION

The present invention includes several advantages, not all of which are incorporated in a single embodiment. It provides a splayed material, which can be effectively incorporated into a polymer-layered material nanocomposite. In addition, such polymer-layered material nanocomposites can be incorporated into an article with improved physical properties such as modulus, tensile strength, toughness, impact resistance, electrical conductivity, heat distortion temperature, coefficient of linear thermal expansion, fire retardance, oxygen and water vapor barrier properties, scratch and abrasion resistance and the like. The application of such articles in a number of industrial sectors, such as automotive, packaging, battery, cosmetics, aerospace, etc. have been elucidated in the literature (vide, for example, "Polymer-layered material Nanocomposites," Ed. T. J. Pinnavia and G. W. Beall, John Wiley & Sons, Ltd. Publishers).

The present invention provides a N-oxyazinium compounds capable of splaying as well as acting as a photoinitiator and any optional matrix polymer can all be combined in a single step into a coating composition, which can be subsequently coated and cured.

The invention has an additional advantage of intercalating/exfoliating the layered materials with an N-oxyazinium photoinitiator, which may be monomeric, dimeric, oligomeric, or prepolymeric, wherein the bridging of the matrix polymer and layered materials can be readily achieved. The splayed materials of this invention are also advantageous in processing versatility. The N-oxyazinium photoinitiator of the present invention have good solubility or dispersibility in aqueous media. This characteristic allows for an environmentally attractive coating process. The molecular weights can be controlled easily to meet the processing conditions, such as temperature, shear, viscosity and product needs, such as various physical properties.

Another advantage of the invention derives from the fact that the layered material, the N-oxyazinium photoinitiator and any optional matrix polymer can all be combined in a single step into a coating composition, which can be subsequently coated and cured.

DETAILED DESCRIPTION OF THE INVENTION

When reference in this application is made to a particular group, unless otherwise specifically stated, the group may itself be unsubstituted or substituted with one or more substituents (up to the maximum possible number). For example, "alkyl" group refers to a substituted or unsubstituted alkyl group, such as arylalkyl group or sulfoalkyl group while "aryl" group refers to a substituted or unsubstituted aryl group (with up to six substituents) such as alkylaryl or sulfoaryl group. The substituent may be itself substituted or unsubstituted.

Generally, unless otherwise specifically stated, substituents include any substituents, whether substituted or unsubstituted, which do not destroy properties necessary for the intended utility. Examples of substituents include known substituents, such as: halogen, for example, chloro, fluoro, bromo, iodo; alkoxy, particularly those "lower alkyl" (that is, with 1 to 6 carbon atoms, for example, methoxy, ethoxy; substituted or unsubstituted alkyl, particularly lower alkyl (for example, methyl, trifluoromethyl); thioalkyl (for example, methylthio or ethylthio), particularly either of those with 1 to 6 carbon atoms; substituted and unsubstituted aryl, particularly those having from 6 to 20 carbon atoms (for example, phenyl); and substituted or unsubstituted heteroaryl, particularly those having a 5 or 6-membered ring containing 1 to 3 heteroatoms selected from N, O, or S (for example, pyridyl, thienyl, furyl, pyrrolyl); acid or acid salt groups such as any of those described below; and others known in the art. Alkyl substituents may specifically include "lower alkyl" (that is, having 1-6 carbon atoms), for example, methyl, ethyl, and the like. Further, with regard to any alkyl group or alkylene group, it will be understood that these can be branched or unbranched and include ring structures.

A "mer" is defined as a group of atoms that constitutes a polymer chain repeat unit. A "mer" may comprise a monomer, a polymer, an oligomer, and the like which maintains some reactivity so as to be crosslinkable.

As used herein, the term "curing" means the polymerization of functional oligomers and monomers, or even polymers, into a crosslinked polymer network. Thus, curing is the polymerization of unsaturated monomers or oligomers in the presence of crosslinking agents.

The term "polymerizer" is meant to include any unsaturated material capable of undergoing polymerization. The term encompasses unsaturated monomers, oligomers, and crosslinking agents. Again, the singular form of the term is intended to include both the singular and the plural.

The term "polymerization" is used herein to mean the combining, e.g. covalent bonding, of large numbers of smaller molecules, such as monomers, to form very large molecules, i.e., macromolecules or polymers. The monomers may be combined to form only linear macromolecules or they may be combined to form three-dimensional macromolecules, commonly referred to as crosslinked polymers.

Present invention provides a N-oxyazinium compounds capable of splaying as well as acting as a photoinitiator and any optional matrix polymer can all be combined in a single step into a coating composition, which can be subsequently coated and cured. One aspect of the invention includes a light curable composition comprising a layered material, an N-oxyazinium salt and an ethylenically unsaturated polymerizer. In another aspect, the present invention includes a method of making a light curable composition. The method includes steps of (1) addition of N-oxyazinium photoinitiator into a dispersion of layered material; (2) addition of ethylenically unsaturated polymerizer; (3) Coating the aforesaid composition on a suitable substrate, and (4) exposure to light to cure.

The N-oxyazinium compound is represented by general formula I

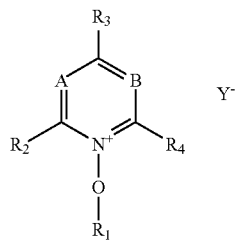

wherein A and B independently represent a carbon, $C—R_5$, $C—R_6$ or nitrogen; each $R_1$, $R_2$, $R_3$, $R_4$, is independently hydrogen, alkyl or an aryl group; any A, B and R groups where chemically feasible may join to form a ring; and Y is a charge balancing anion, which may be a separate moiety or part of an A, B, or R.

In a useful embodiment, the azinium salts in the present invention are represented by formula II:

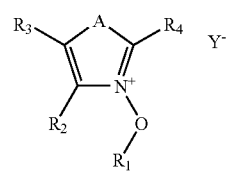

wherein A represents a carbon, $C—R_5$, nitrogen, sulfur or oxygen atom with sufficient bonds and substituents to form a heteroaromatic ring and each R independently represents a hydrogen or a substituent. Each $R_1$, $R_2$, $R_3$, and $R_4$, is independently hydrogen, alkyl or an aryl group; any two or more R substituents may form a ring; and Y is a charge balancing anion, which may be a separate moiety or part of an R.

Useful N-oxyazinium compounds can also be attached as functional groups in polymerized chains, represented by the following formula

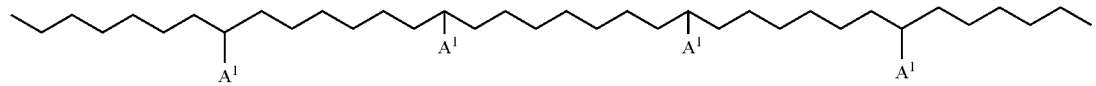

wherein $A^+$ is the N-oxyazinium moiety. The linking alkyl chain may have additional substituents, for example, ether, ester, or amide.

In another useful embodiment, the azinium salts in the present invention are represented by formulas III and IV:

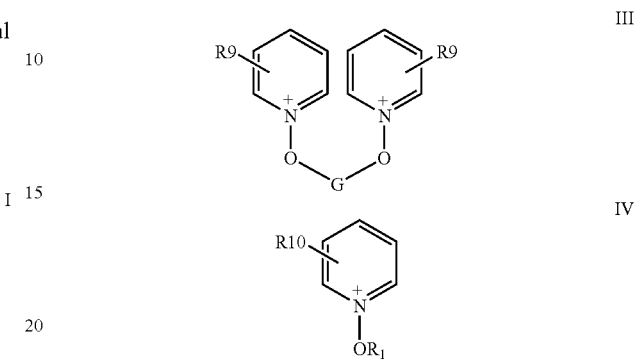

wherein $R_1$ is an alkyl, or an aryl, $R_{10}$ or $R_9$ are independently a hydrogen atom, alkyl, aryl, heterocyclic, carboxylic, carboxylate, carbonamido, sulfonamido, nitryl, groups, $—CO—R_{11}$ wherein $R_{11}$ is an alkyl group or aryl group, or $—(CH=CH)_m—R_{12}$ group wherein $R_{12}$ is an aryl or heterocyclic group and m is 1 or 2; G is an alkylene group, preferably $—(CH_2)_n—$ wherein n is from 1 to 12.

The $R_1$ of the N-oxyazinium compound may be selected from among a variety of synthetically convenient oxy groups. The group $R_1$ can, for example, be an alkyl group such as methyl, ethyl, butyl, benzyl, an aralkyl group (e.g. for example, benzyl or phenethyl) and a sulfoalkyl group (e.g. for example, sulfomethyl). The group $R_1$ may be an aryl group such as a phenyl group. In another form $R_1$ may be an acyl group, such as an $—C(O)—R_{11}$ group, where $R_{11}$ is an alkyl and aryl groups such as phenyl or naphthyl, tolyl, or xylyl, etc. When $R_1$ is an alkyl group, it typically contains from 1 to 18 carbon atoms, when $R_1$ is an aryl group, it typically contains from 6 to 18 carbon atoms.

According to a specific embodiment, $R_1$ is preferably an alkyl having from 1 to 18 carbon atoms or an aryl group having from 6 to 18 carbon atoms.

Illustrative examples of useful substitutents in structures III and IV are shown in Table 1 below:

| $R_{10}$ or $R_9$ | $R_1$ or G |
| --- | --- |
| A-1 | $R_{10}$ = 4-Ph | $R_1$ = Me |
| A-2 | $R_{10}$ = 4-Ph | $R_1$ = $(CH_2)_3$—Ph |
| A-3 | $R_{10}$ = 4-Ph | $R_1$ = $(CH_2)_3$—$SO_3^-$ |

-continued

| | $R_{10}$ or $R_9$ | $R_1$ or G |
|---|---|---|
| A-4 | $R_{10}$ = 4-Ph | $R_1$ = 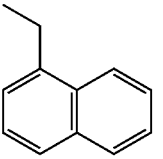 |
| A-5 | $R_{10}$ = 4-Ph | $R_1$ = 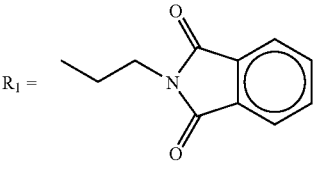 |
| A-6 | $R_{10}$ = 4-CN | $R_1$ = Me |
| A-7 | $R_{10}$ = 3-CO$_2$Me | $R_1$ = Me |
| A-8 | $R_{10}$ = 3-CO$_2$—(CH$_2$)$_2$—Ph | $R_1$ = Me |
| A-9 | $R_9$ = 4-Ph | G = (CH$_2$)$_3$ |
| A-10 | $R_9$ = 4-Ph | G = (CH$_2$)$_4$ |
| A-11 | $R_9$ = 4-Ph | G = (CH$_2$)$_5$ |
| A-12 | $R_{10}$ = 3-Ph | $R_1$ = Me |
| A-13 | $R_{10}$ = 3,4-benzo | $R_1$ = Me |
| A-14 | $R_9$ = 3,4-benzo | G = (CH$_2$)$_3$ |

-continued

| | $R_{10}$ or $R_9$ | $R_1$ or G |
|---|---|---|
| A-15 | $R_{10}$ = H | $R_1$ = (CH$_2$)$_3$—SO$_3^-$ |
| A-16 | $R_{10}$ = H | $R_1$ = 4-nitrophenyl |
| A-17 | $R_9$ = H | G = (CH$_2$)$_2$ |
| A-18 | $R_9$ = H | G = (CH$_2$)$_3$ |
| A-19 | $R_{10}$ = 2-Me | $R_1$ = Me |
| A-20 | $R_{10}$ = 2-Me | $R_1$ = (CH$_2$)$_3$—SO$_3^-$ |
| A-21 | $R_{10}$ = 4-Me | $R_1$ = Me |
| A-22 | $R_9$ = 4-Me | G = (CH$_2$)$_4$ |
| A-23 | $R_{10}$ = 4-CO$_2^-$ | $R_1$ = Me |
| A-24 | $R_{10}$ = 4-CON(CH$_2$CH$_2$OH)$_2$ | $R_1$ = (CH$_2$)$_3$—SO$_3^-$ |

The N-oxyazinium compounds are associated with a counter ion that is not involved in the activity of the present photoinitiator or splayant and may be any of the conventional anions, for example, halide, fluoroborate, hexafluorophosphate, or toluene sulfonate. The counter ion may also be an oligomeric or polymeric species. Any convenient charge balancing counter ion may be employed to complete the N-oxyazinium compounds.

Illustrative examples of useful N-oxyazinium compounds are shown by the formulae below in Table 2:

TABLE 2

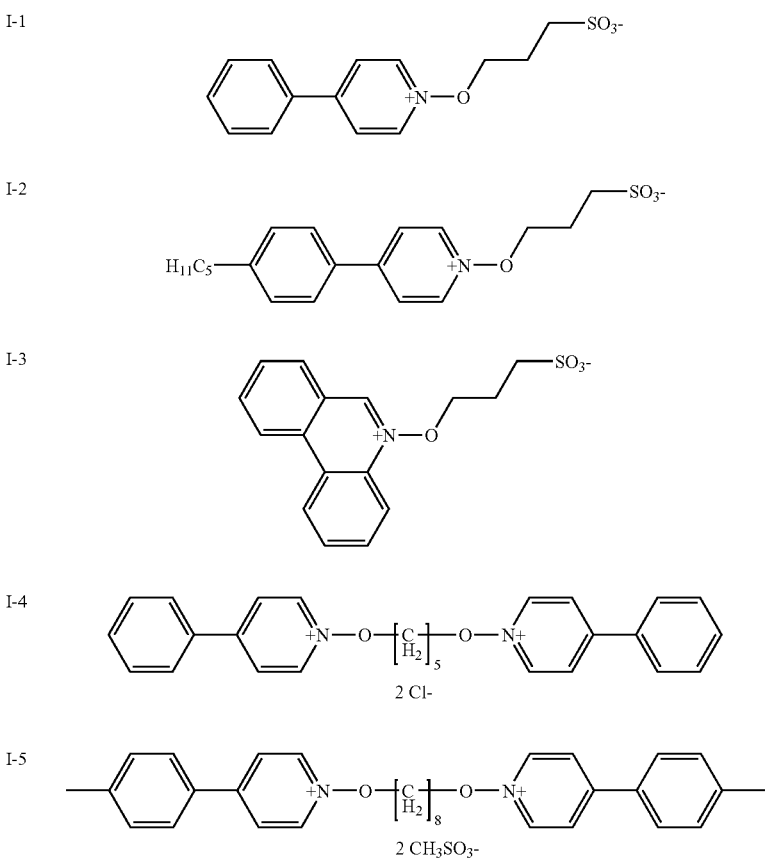

TABLE 2-continued
I-6 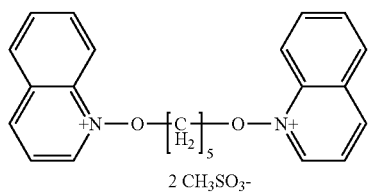
2 CH₃SO₃⁻
I-7 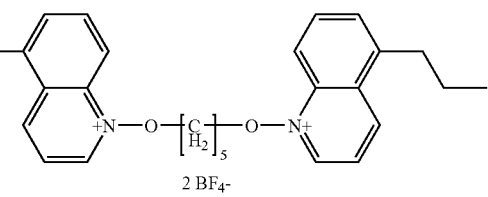
2 BF₄⁻
I-8 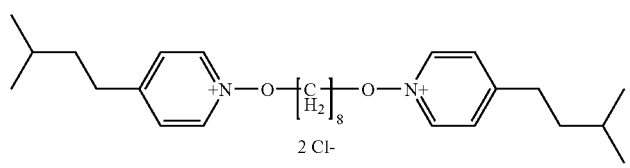
2 Cl⁻
I-9 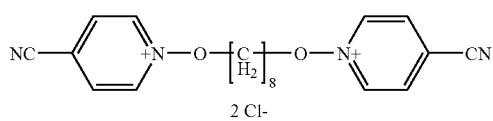
2 Cl⁻
I-10 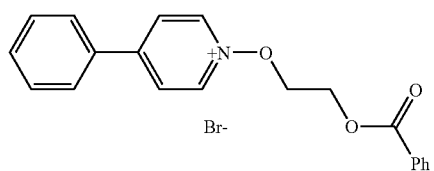
Br⁻
I-11 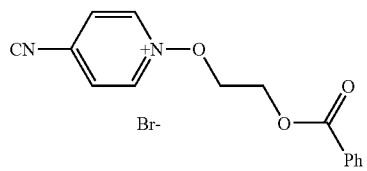
Br⁻
I-12 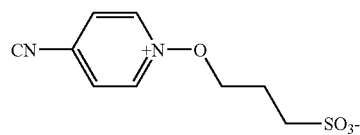
I-13 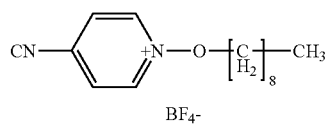
BF₄⁻
I-14 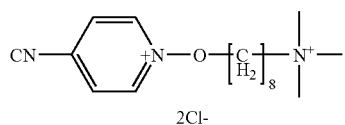
2Cl⁻
I-15 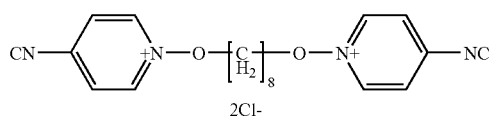
2Cl⁻

TABLE 2-continued
I-16 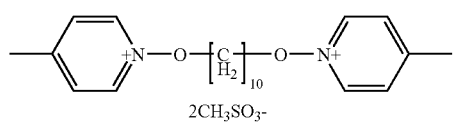
I-17 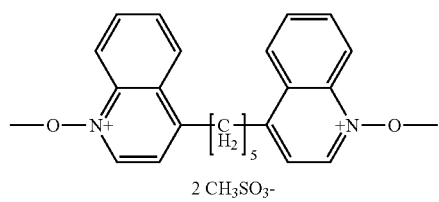
I-18 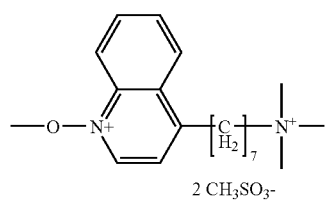
I-19 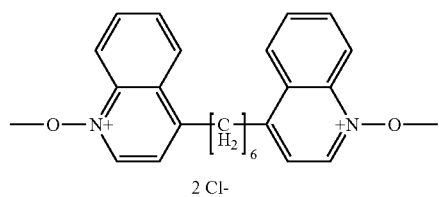
I-20 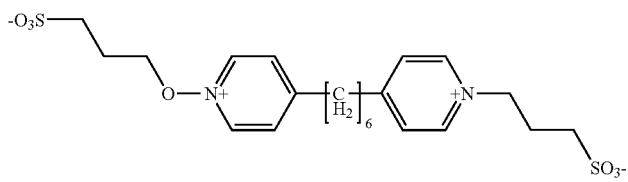
I-21 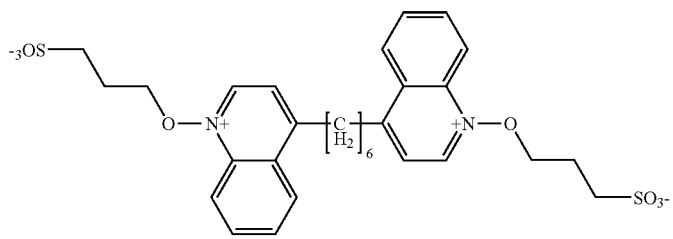
I-22 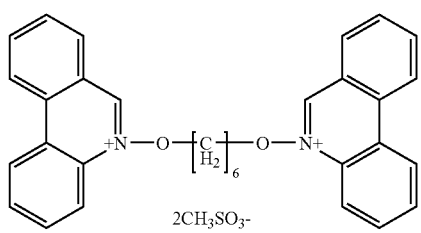

TABLE 2-continued

I-23
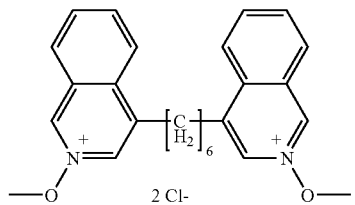
2 Cl-

I-24
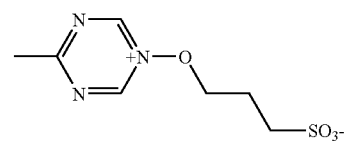

I-25
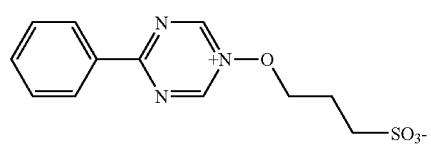

I-26
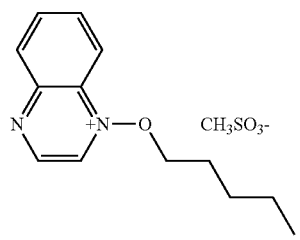
CH₃SO₃-

I-27
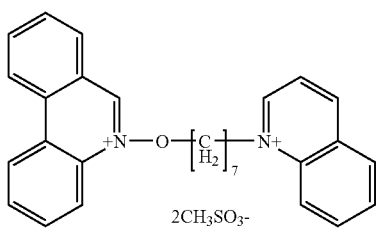
2CH₃SO₃-

The layered materials most suitable for this invention include materials in the shape of plates with significantly high aspect ratio. However, other shapes with high aspect ratio will also be advantageous. The layered materials suitable for this invention comprise clays or non-clays. These materials include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the layered materials named above. Other useful layered materials, particularly useful with anionic matrix polymers, are the layered double hydroxide clays or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be splayed with swelling agents, which expand their interlayer spacing. Such materials include chlorides such as $FeCl_3$, FeOCl, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4$—$2H_2O$, $CaPO_4CH_3$—$H_2O$, $MnHAsO_4$—$H_2O$, $Ag_6Mo_{10}O_{33}$ and the like. Preferred layered materials are swellable so that other agents, usually organic ions or molecules, can intercalate and/or exfoliate the layered material resulting in a desirable dispersion of the inorganic phase. These swellable layered materials include phyllosilicates of the 2:1 type, as defined in the literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred. Preferred layered materials for the present invention include clays, especially smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred layered materials include montmorillonite, hectorite and hydrotalcites, because of commercial availability of these materials.

The aforementioned layered materials can be natural or synthetic, for example, synthetic smectite layered materials.

This distinction can influence the particle size and/or the level of associated impurities. Typically, synthetic layered materials are smaller in lateral dimension, and therefore possess smaller aspect ratio. However, synthetic layered materials are purer and are of narrower size distribution, compared to natural clays and may not require any further purification or separation. For this invention, the clay particles should have a lateral dimension of between 0.01 μm and 5 μm, and preferably between 0.05 μm and 2 μm, and more preferably between 0.1 μm and 1 μm. The thickness or the vertical dimension of the clay particles can vary between 0.5 nm and 10 nm, and preferably between 1 nm and 5 nm. The aspect ratio, which is the ratio of the largest and smallest dimension of the layered material particles should be >10:1 and preferably >100:1 and more preferably >1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects, such as haze, and can be abrasive to processing, conveyance and finishing equipment as well as the imaging layers.

The clay used in this invention can be an organoclay. Organoclays may be produced by interacting the unfunctionalized clay with suitable intercalants. These intercalants may be typically organic compounds, which may be neutral or ionic. Useful neutral organic molecules include polar molecules such as amides, esters, lactams, nitriles, ureas, carbonates, phosphates, phosphonates, sulfates, sulfonates, nitro compounds, and the like.

The neutral organic intercalants can be monomeric, oligomeric or polymeric. Neutral organic molecules can cause intercalation in the layers of the layered materials through hydrogen bonding, without completely replacing the original charge balancing ions. Useful ionic compounds may be cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays are available from clay vendors, which may be used in the practice of this invention.

The layered material may also be splayed by the initiator according to the invention, which is one or more of any of the N-oxyazinium compounds disclosed herein above and also described in U.S. application Ser. No. 11/095,285, co-filed herewith and incorporated herein by reference. The N-oxyazinium compounds are associated with a counter ion that is not involved in the activity of the present splayant and can be any of the conventional anions, e.g., halide, fluoroborate, hexafluorophosphate, toluene sulfonate, etc. The counter ion can also be an oligomeric or polymeric species. The counter ion Y may be a separate moiety or part of the A, B, or R groups. In the case where the splayant and the initiator are the same or are both N-oxyazinium compounds, the initiator/splayant may be added to the layered material or may be added to the layered material at the same time as the polymerizer.

When used as a splayant as well as photoinitiator, the weight ratio of the layered materials to N-oxyazinium compound can vary from 0.1:99.9 to 99.9:0.1. However it is preferred to be between 90:10 to 50:50 and more preferred to be between 80:20 and 60:40 in order to optimize the desirable physical properties of the resultant nanocomposite material.

The layered materials and N-oxyazinium photoinitiator, when utilized also as the splayant, can be interacted for intercalation/exfoliation by any suitable means known in the art of making nanocomposites. The splayed layered material can be further dispersed in a matrix polymer, either with the polymerizer or to a matrix already including the polymerizer. Such matrix polymer can be any natural or synthetic polymer. The matrix polymer may also be any water soluble or insoluble polymer. The water soluble polymers preferred include gelatin, poly(vinyl alcohol), poly(ehtylene oxide), polyvinylpyrolidinone, poly(acrylic acid), poly(styrene sulfonic acid), polyacrylamide, and quaternized polymers.

The splayed layered materials can be further interacted with matrix polymers by any suitable means known in the art of making nanocomposites. The order and method of addition of layered material, azinium and polymerizer, matrix, and optional addenda can be varied.

When incorporated in a polymer matrix, the weight ratio of the splayed material (layered material/highly branched) to polymer matrix can vary from 0.1:99.9 to 99.9:0.1. However it is preferred to be between 1:99 to 50:50, and more preferred to be between 2:98 and 20:80, and most preferred to be between 3:97 and 15:85 in order to optimize the desirable physical properties of the nanocomposite.

For the practice of the present invention, it is important to ensure compatibility between the matrix polymer and at least part of the N-oxyazinium photoinitiator, when used for layered material intercalation or exfoliation. If the matrix polymer comprises a blend of polymers, the polymers in the blend should be compatible with at least part of the N-oxyazinium photoinitiator used for layered material splaying. If the matrix polymer comprises copolymer(s), the copolymer(s) should be compatible with at least part of the N-oxyazinium photoinitiator used for layered material splaying.

The matrix polymer may also contain optional addenda, which may include, but are not limited to, nucleating agents, fillers, plasticizers, impact modifiers, chain extenders, colorants, lubricants, antistatic agents, pigments such as titanium oxide, zinc oxide, talc, calcium carbonate, dispersants such as fatty amides, (for example, stearamide), metallic salts of fatty acids, for example, zinc stearate, magnesium stearate, dyes such as ultramarine blue, cobalt violet, antioxidants, fluorescent whiteners, ultraviolet absorbers, fire retardants, roughening agents, matt beads, inorganic or polymeric particles, cross linking agents, surfactants, lubricants and voiding agents. These optional addenda and their corresponding amounts can be chosen according to need.

The order and the method of addition of layered material, azinium photoinitiator, and optional addenda can be varied. In one preferred embodiment, the layered materials can be melt blended with the other components at temperatures preferably comparable to the components melting point or above, with or without shear. In still another preferred embodiment, the layered materials and other components can be combined in a solvent phase to achieve intercalation/exfoliation. The resultant solution or dispersion can be used as is or with solvent removal through drying. The solvent can be aqueous or organic. The organic solvent can be polar or nonpolar.

A polymerizer of the present invention is any compound containing ethylenic unsaturation which may be a monomer, oligomer or a polymer. In one embodiment of the invention, the ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof.

Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

In general, individual monomers capable of a degree of cure of about 80% or more are more desirable than those having a lower degree of cure. Degree of cure may be defined as the ratio of double bonds that react during the curing process to the total number of double bonds in the formulation. For example if the formulation starts out with 100 double bonds and after cure 80 of the double bonds are reacted, the degree of cure is 80%. The degree to which monomers having lower conversion rates can be introduced into the composition depends upon the particular requirements (i.e., strength) of the resulting cured product. Typically, higher conversion rates will yield stronger cured products.

In another embodiment, ethylenically unsaturated compounds are the mono- or poly-functional acrylate compounds as a class. In one of the preferred polymerizer compositions, a mixture of mono- and poly-fucntional acrylate compounds is used.

Suitable poly-functional ethylenically unsaturated monomers include, without limitation, alkoxylated bisphenol A diacrylates such as ethoxylated bisphenol A diacrylate with ethoxylation being 2 or greater, preferably ranging from 2 to about 30, e.g. SR349 and SR601 available from Sartomer Company, Inc. (West Chester, Pa.); Photomer 4025 and Photomer 4028, available from Cognis Corp. (Ambler, Pa.); propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Cognis Corp., and SR499, Sartomer Company, Inc.); propoxylated trimethylolpropane triacrylate with propoxylation being 3 or greater, preferably ranging from 3 to 30 (e.g., Photomer 4072, Cognis Corp. and SR492, Sartomer); ditrimethylolpropane tetraacrylate (e.g., Photomer 4355, Cognis Corp.); alkoxylated glyceryl triacrylates such as propoxylated glyceryl triacrylate with propoxylation being 3 or greater (e.g., Photomer 4096, Cognis Corp. and SR9020, Sartomer); erythritol polyacrylates with and without alkoxylation, such as pentaerythritol tetraacrylate (e.g., SR295, available from Sartomer Company, Inc. (West Chester, Pa.); ethoxylated pentaerythritol tetraacrylate (e.g., SR494, Sartomer Company, Inc.); dipentaerythritol pentaacrylate (e.g., Photomer 4399, Cognis Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.); ethoxylated polyethylene glycol diacrylate with ethoxylation being 2 or greater, preferably ranging from about 2 to 30; epoxy acrylates formed by adding acrylate to bisphenol A diglycidylether and the like (e.g., Photomer 3016, Cognis Corp.); and single and multi-ring cyclic aromatic or non-aromatic polyacrylates such as dicyclopentadiene diacrylate and dicyclopentane diacrylate.

In an additional aspect, it may also be desirable to use certain amounts of mono-functional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acryl ate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid ester and fumaric acid ester.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

In one embodiment, vinyl acetate or other vinyl esters; acrylonitrile and methacrylonitrile or other vinyl cyanide compound; vinylidene chloride and vinyl chloride or other halogenated monomer; styrene, 2-methylstyrene, vinyl toluene, t-butyl styrene, chlorostyrene, vinyl anisol and vinyl naphthalene or other aromatic vinyl monomer; the ethylene, propylene and isopropylene or other olefins; butadiene and chloroprene or other dienes; vinyl ether, vinyl ketone and vinyl pyrrolidone or other vinyl monomer can be used in the invention.

In another embodiment, it is preferred that monomers possess hydrophilic groups for solubility or dispersibility in water. The hydrophilic group, for example, could be carboxyl group, sulfonic acid group, amide group, amino group, ether group or the hydroxy group. A crosslinkable monomer could possess more than one kind of hydrophilic groups.

The material of the instant invention comprising the layered materials, the N-oxyazinium photoinitiator, and polymerizer, together with any optional addenda, can be formed by any suitable method such as, coating, extrusion, co-extrusion, with or without orientation by uniaxial or biaxial, simultaneous or consecutive, stretching, blow molding, injection molding, lamination, solvent casting, and the like.

In a preferred embodiment, the layered materials can be initially dispersed in a suitable solvent, preferably water or water-based. A suitable azinium compound is incorporated in to this dispersion either as a solid or as a solution or dispersion. Additional polymerizer can also be incorporated into this dispersion. As per the invention, the layered materials are sufficiently splayed by an intercalant or the azinium compound. Such a dispersion is eventually polymerized and/or incorporated in a matrix polymer, with the layered materials dispersed in a splayed state in the resultant nanocomposite. Polymerization is preferably carried out in the presence of a suitable radiation.

In another preferred embodiment, the layered materials can simultaneously be combined with the N-oxyazinium compound photoinitiator and the polymerizer, with or without an additional matrix polymer. In another preferred embodiment, the layered materials, the N-oxyazinium compound photoinitiator can be dispersed in suitable matrix monomers or oligomers, which are subsequently polymerized by step or chain polymerization. In still another preferred embodiment, the layered material can be splayed by more than one azinium compound and can be further dispersed in more than one polymerizer, to ultimately form the desired nanocomposite. In another preferred embodiment, the layered materials splayed by the azinium compound or a different intercalant can be melt blended with other components with or without shear.

In another preferred embodiment, the layered materials can be melt blended with the other components with or without shear. In yet another preferred embodiment, the layered materials, the N-oxyazinium, the polymerizer, and the matrix can be combined in a solvent phase to achieve intercalation/exfoliation. The resultant solution or dispersion can be used as is or with solvent removal through drying. The solvent can be aqueous or organic. The organic solvent can be polar or nonpolar.

The layered material, N-oxyazinium initiator, polymerizer and optional polymeric matrix may be formed into an article. The article of the instant invention comprising the layered materials, and the N-oxyazinium compound, together with any optional addenda, can be formed by any suitable method such as, extrusion, co-extrusion with or without orientation by uniaxial or biaxial, simultaneous or consecutive stretching, blow molding, injection molding, lamination, coating or solvent casting, and the like.

The article of the invention can be of any size and form, a liquid such as a solution, dispersion, latex and the like, or a solid such as a sheet, rod, particulate, powder, fiber, wire, tube, woven, non-woven, support, layer in a multilayer structure, and the like. The article of the invention can be used for any purpose, as illustrated by packaging, woven or non-woven products, protective sheets or clothing, and medical implement In one preferred embodiment of the invention, the article comprises the base of an imaging member. Such imaging members include those utilizing photographic, electrophotographic, electrostatographic, photothermographic, migration, electrothermographic, dielectric recording, thermal dye transfer, inkjet and other types of imaging. In a more preferred embodiment of the invention, the article comprises the base of a photographic imaging member, particularly a photographic reflective print material, such as paper or other display product.

Typical bases for imaging members comprise matrix polymers including cellulose nitrate, cellulose acetate, poly (vinyl acetate), polystyrene, polyolefins, poly(ethylene terephthalate), poly(ethylene naphthalate), polycarbonate, polyamide, polyimide, glass, natural and synthetic paper, resin-coated paper, voided polymers, microvoided polymers, microporous materials, nanovoided polymers and nanoporous materials, fabric, and the like. The material comprising a matrix polymer and the splayed layered materials can be incorporated in any of these materials and/or their combination for use in the base of the appropriate imaging member. In case of a multilayered imaging member, the aforementioned material can be incorporated in any one or more layers, and can be placed anywhere in the imaging support, e.g., on the topside, or the bottom side, or both sides, and/or in between the two sides of the support. The method of incorporation can include extrusion, co-extrusion with or without stretching, blow molding, casting, co-casting, lamination, calendering, embossing, coating, spraying, molding, and the like. The image receiving layer or layers, as per the invention, can be placed on either side or both sides of the imaging support.

In one preferred embodiment, the imaging support comprising a matrix polymer and the splayed layered materials may be formed by extrusion and/or co-extrusion, followed by orientation, as in typical polyester based photographic film base formation. Alternatively, a composition comprising a matrix polymer and the splayed layered materials can be extrusion coated onto another support, as in typical resin coating operation for photographic paper. In another embodiment, a composition comprising a matrix polymer and the splayed layered materials can be extruded or co-extruded and preferably oriented into a preformed sheet and subsequently laminated to another support, as in the formation of typical laminated reflective print media.

In a preferred embodiment, the material of this invention may be incorporated in imaging supports used for image display such as reflective print media including papers, particularly resin-coated papers, voided polymers, and combinations thereof. Alternatively, the imaging support may comprise a combination of a reflective medium and a transparent medium, in order to realize special effects, such as day and night display. In a preferred embodiment, at least one layer comprising the material of the present invention is incorporated in a paper support, because of its widespread use. In another preferred embodiment, at least one layer comprising the nanocomposite of the present invention may be incorporated into an imaging support comprising a voided polymer, because of its many desirable properties such as tear resistance, smoothness, improved reflectivity, metallic sheen, and day and night display usage.

The imaging supports can comprise any number of auxiliary layers. Such auxiliary layers may include antistatic layers, back mark retention layers, tie layers or adhesion promoting layers, abrasion resistant layers, conveyance layers, barrier layers, splice providing layers, UV absorption layers, antihalation layers, optical effect providing layers, waterproofing layers, and the like.

The method of the present invention comprises providing layered material, splaying said layered material, combining said splayed layered material with a polymerizer and an aqueous soluble N-oxyazinium compound, and subjecting said combination to light for a period of time sufficient to effect the desired degree of polymerization.

Light sources useful for curing are conventional medium and high pressure xenon and mercury lamps, halogen lamps, or tunable lasers emitting between, 300 nm-550 nm. The light may be filtered out by appropriate filters for selective exposure of the N-oxyazinium compound and/or photosensitizers. The exposure time varies from a few milliseconds when flash lamps are used to several tens of seconds when low intensity light sources are used.

The N-oxyazinium photoinitiator upon direct absorption of light of appropriate energy generates a free radical that initiates the curing process. N-oxyazinium compound photoinitiator may generate free radicals in several different ways:

(1) the N-oxyazinium photoinitiator undergoes excitation by energy absorption with subsequent decomposition into one or more radicals; or (2) the N-oxyazinium photoinitiator undergoes excitation and the excited species interacts with a second compound (by either energy transfer or a redox reaction) to form free radicals from the latter and/or former compound(s).

(3) the N-oxyazinium compound interacts with a second excited species viz., a photosensitizer, to form free radicals.

When using a photosensitizer it is preferred that photosensitizer predominates as the light-absorbing component. That is, all or at least more than 50% of the activating radiation, is absorbed by the photosensitizer. UK Patent application GB2083832A discloses use of photosensitizers with N-oxyazinium compounds as photoinitiators. When using a photosensitizer it is preferred that photosensitizer predominates as the light-absorbing component. That is, all or at least more than 50% of the activating radiation, is absorbed by the photosensitizer. Examples of useful photosensitizers include those having an aromatic or heterocyclic ring having an amino substituent such as a dialkylamino group containing up to 5 carbon atoms per alkyl group for 30 example, dimethylamino, diethylamino, dipropylamino containing from 1 to 5 carbon atoms per alkyl for example, dimethylamino, diethylamino, dipropylamino and dibutylamino; piperidinyl; N pyrrolidinyl; morpholino; or substituents that together form a fused hydroquinolizine ring on said aromatic or heterocyclic ring. For example, useful sensitizers include amino-substituted thiazoline and selenazoline sensitizers as described in U.S. Pat. No. 4,062,686 and amino-substituted indanediones, benzophe-nones, benzylideneacetophenones, and bis(benzylidine) cyclopentanones. Most preferred are keto-coumarins.

Also highly preferred are amino-substituted 3-keto-coumarins having polar moieties or substituents, such as ionic moieties, and especially those containing water-soluble and/ or alcohol-soluble portions. Useful examples include, attached to the keto group in the 3-position, heterocyclic onium salt group, e.g., pyridinium salt and imidazolium salts, and groups containing solubilizing substituents such as a carboxylate salt, sulphonate salt, quaternized NXN-trisubstituted amino, e.g., an N-phenylene-N,N,N-trimethylammonium chloride. Examples of such substituents attached to the coumarin rings include groups containing substituents such as carboxy, carboxyalkyl, carboxyaryl, sulpho, sulphoalkyl, sulphoaryl and the monovalent metal or ammonium (including totraorganoammonium) salts of said carboxy and sulpho substitutents, 20 and quaternary ammonium salt groups such as are noted above.

The following examples are provided to illustrate the invention.

EXAMPLES

Examples of Light Curable Material

Aqueous sols of the smectite clay Cloisite were mixed in different proportions with aqueous solutions of the N-oxyazinium compound and a polymerizer, that is, a light curable compound, namely an ethoxylated trimethyl propane triacrylate (SR 9035, supplied by Sartomer). The mixtures were stirred for 24 hours, and subsequently coated on glass slides, dried and analyzed by X-ray diffraction (XRD) technique. XRD measurement revealed the (001) basal plane spacing of the smectite clay in the films. An increase in the basal plane spacing of the smectite clay in the films, as compared to the neat clay, is indicative of splaying of the clay lattice.

In Table B the details of the compositions of the clay, azinium compound and the triacrylate mixtures and the corresponding XRD data are provided. It is clear that the basal plane spacing of the smectite clay increased in presence of the N-oxyazinium compound and the triacrylate, demonstrating that the layered materials are splayed in the light curable composite film.

TABLE B

Wt. % pyridinium Ph—⟨+N—O—⟩—SO$_3^-$

| Sample # | Wt. % Cloisite | Wt. % SR9035 | (001) spacing of clay in film (Å) | (001) spacing of neat clay (Å) |
|---|---|---|---|---|
| 4 | 4.55 | 4.55 | 90.9 | 31 | 12.9 |
| 5 | 4 | 16 | 80 | 31 | 12.9 |

In another example, an aqueous sol of the smectite clay Laponite RDS was mixed with aqueous solutions of the N-oxyazinium compound of the following structure and the polymerizer, ethoxylated trimethyl propane triacrylate (SR 9035, supplied by Sartomer). The mixture was stirred for 24 hours, and subsequently coated on glass slides, dried and exposed to UV light (313 nm) for curing. The films were analyzed by X-ray diffraction (XRD) technique before and after UV curing.

In Table C the details of the compositions of the clay, N-oxyazinium compound and the triacrylate mixtures and the corresponding XRD data are provided. No (001) peak corresponding to the smectite clay can be detected in these films, which is indicative of exfoliation of the clay in the nanocomposite. Thus the examples illustrate that layered materials are splayed with N-oxyazinium compound combined with polymerizer before and after light curing, as per the invention.

TABLE C

| Sample # | Wt. % Laponite RDS | Wt. % pyridinium Ph—⟨pyridinium-N⁺—O—(CH₂)₃—SO₃⁻⟩ | Wt. % SR9035 | (001) spacing of clay in film (A) | (001) spacing of neat clay (A) |
|---|---|---|---|---|---|
| 1 (before UV curing) | 15 | 10 | 75 | None detected | 13.6 |
| 2 (after UV curing) | 15 | 10 | 75 | None detected | 12.9 |

The invention has been described in detail with particular reference to certain preferred embodiments thereof, but it will be understood that variations and modifications can be effected within the spirit and scope of the invention.

What is claimed is:

1. A light curable material comprising a splayed layered material, at least one aqueous dispersible polymerizer, and at least one aqueous soluble N-oxyazinium photoinitiator, wherein said aqueous soluble N-oxyazinium photoinitiator is capable of generating a free radical and wherein said splayed layered material comprises a layered material splayed by said aqueous soluble N-oxyazinium photoinitiator, wherein said polymerizer polymerizes upon exposure to light.

2. The light curable material of claim 1 wherein the said N-oxyazinium photoinitiator is represented by the following formula I:

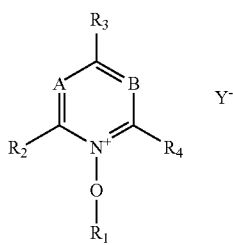

wherein A and B independently represent a carbon, C—R5, C—R6 or nitrogen; each R1, R2, R3, R4, is independently hydrogen, alkyl or an aryl group; and Y is a charge balancing anion.

3. The light curable material of claim 2 wherein said A, B and R groups of said N-oxyazinium photoinitiator are able to join to form a ring.

4. The light curable material of claim 2 wherein Y is a separate moiety or part of said A, B, or R groups.

5. The light curable material of claim 2 wherein said N-oxyazinium photoinitiator is represented by formulas III and IV:

$$\text{III}$$
$$\text{IV}$$

wherein R1 is an alkyl, or an aryl;

R10 or R9 are independently a hydrogen atom, alkyl, aryl, heterocyclic, carboxylic, carboxylate, carbonamido, sulfonamido, nitryl, groups, —CO—R11, wherein R11 is an alkyl group or aryl group, or —(CH=CH)m—R12 group, wherein R12 is an aryl or heterocyclic group and m is 1 or 2; and G is an alkylene group.

6. The light curable material of claim 5 wherein G is —(CH2)n— wherein n is from 1 to 12.

7. The light curable material of claim 5 wherein R1 is an alkyl group having from 1 to 18 carbon atoms or an aryl group having from 6 to 18 carbon atoms.

8. The light curable material of claim 5 wherein:

| R₁₀ or R₉ | R₁ or G |
|---|---|
| R₁₀ = 4-Ph | R₁ = Me |
| R₁₀ = 4-Ph | R₁ = (CH₂)₃—Ph |
| R₁₀ = 4-Ph | R₁ = (CH₂)₃—SO₃⁻ |
| R₁₀ = 4-Ph | R₁ = 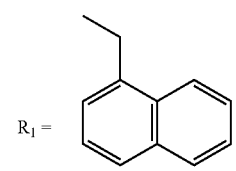 |

-continued

| $R_{10}$ or $R_9$ | $R_1$ or G |
|---|---|
| $R_{10}$ = 4-Ph | 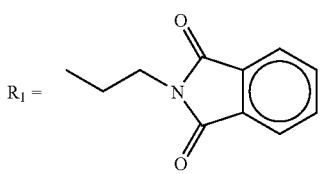 $R_1 =$ |
| $R_{10}$ = 4-CN | $R_1$ = Me |
| $R_{10}$ = 3-CO$_2$Me | $R_1$ = Me |
| $R_{10}$ = 3-CO$_2$—(CH$_2$)$_2$—Ph | $R_1$ = Me |
| $R_9$ = 4-Ph | G = (CH$_2$)$_3$ |
| $R_9$ = 4-Ph | G = (CH$_2$)$_4$ |
| $R_9$ = 4-Ph | G = (CH$_2$)$_5$ |
| $R_{10}$ = 3-Ph | $R_1$ = Me |
| $R_{10}$ = 3,4-benzo | $R_1$ = Me |
| $R_9$ = 3,4-benzo | G = (CH$_2$)$_3$ |

-continued

| $R_{10}$ or $R_9$ | $R_1$ or G |
|---|---|
| $R_{10}$ = H | $R_1$ = (CH$_2$)$_3$—SO$_3^-$ |
| $R_{10}$ = H | $R_1$ = 4-nitrophenyl |
| $R_9$ = H | G = (CH$_2$)$_2$ |
| $R_9$ = H | G = (CH$_2$)$_3$ |
| $R_{10}$ = 2-Me | $R_1$ = Me |
| $R_{10}$ = 2-Me | $R_1$ = (CH$_2$)$_3$—SO$_3^-$ |
| $R_{10}$ = 4-Me | $R_1$ = Me |
| $R_9$ = 4-Me | G = (CH$_2$)$_4$ |
| $R_{10}$ = 4-CO$_2^-$ | $R_1$ = Me |
| $R_{10}$ = 4-CON(CH$_2$CH$_2$OH)$_2$ | $R_1$ = (CH$_2$)$_3$—SO$_3^-$. |

9. The light curable material of claim 1 wherein said N-oxyazinium photoinitiator is represented by at least one of the following formulas:

I-1
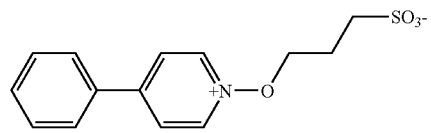

I-2
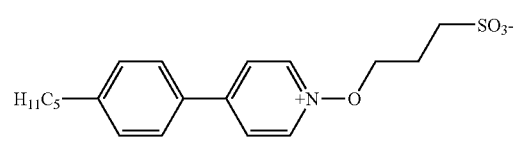

I-3
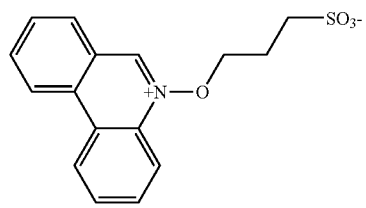

I-4
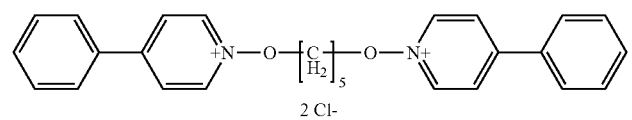

2 Cl-

I-5
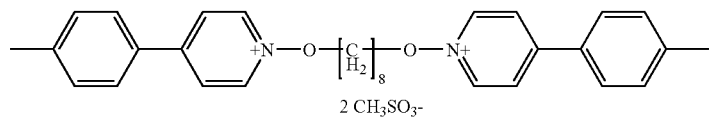

2 CH$_3$SO$_3$-

I-6
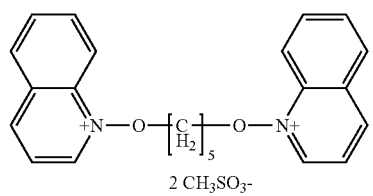

2 CH$_3$SO$_3$-

-continued
I-7 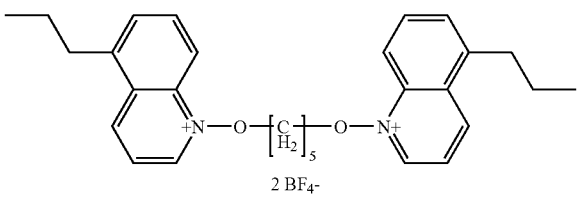
I-8 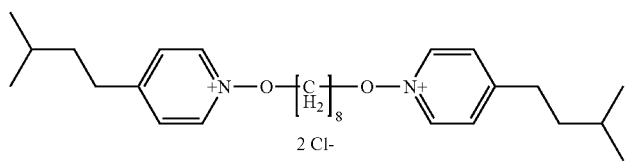
I-9 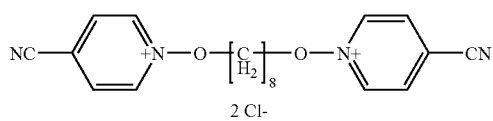
I-10 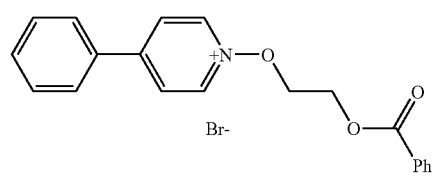
I-11 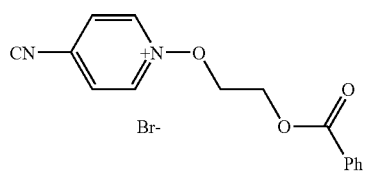
I-12 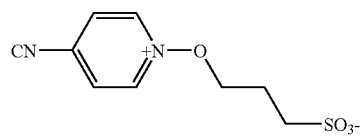
I-13 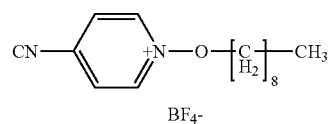
I-14 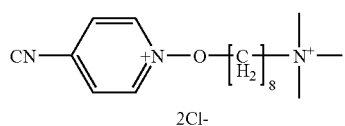
I-15 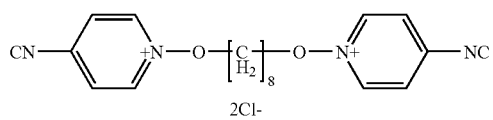
I-16 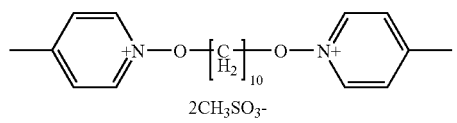

I-17
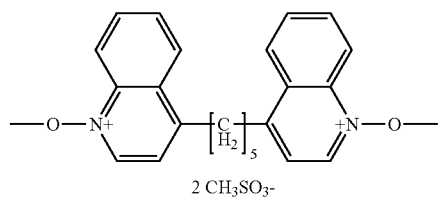
2 CH₃SO₃⁻
I-18
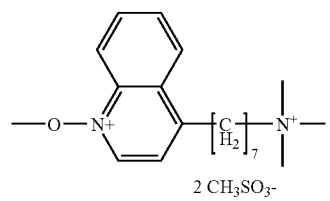
2 CH₃SO₃⁻
I-19
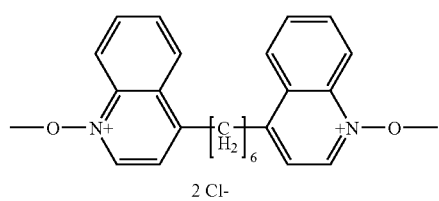
2 Cl⁻
I-20
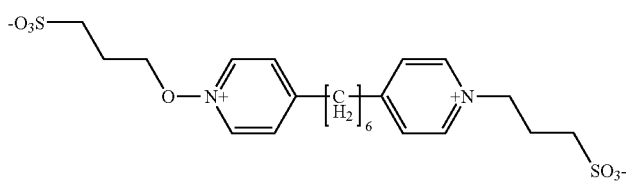
I-21
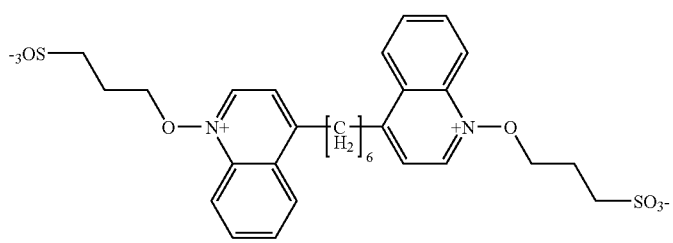
I-22
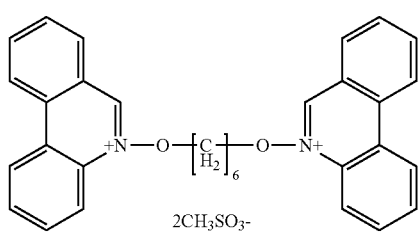
2CH₃SO₃⁻
I-23
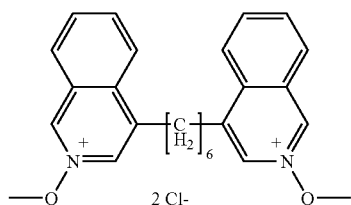
2 Cl⁻

-continued

I-24 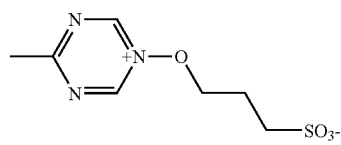

I-25 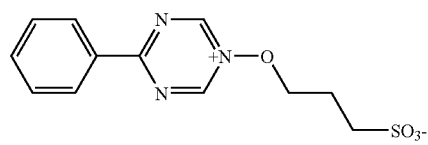

I-26 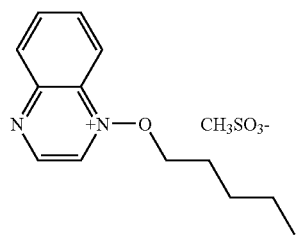

I-27 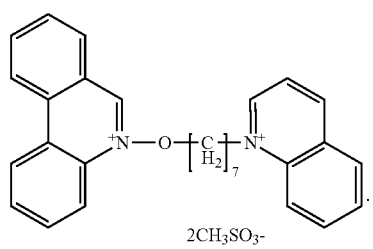

2CH₃SO₃⁻

10. The light curable material of claim 1 wherein said N-oxyazinium photoinitiator is represented by the following formula II:

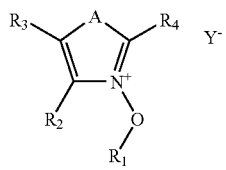

wherein A represents a carbon, C—R5, nitrogen, sulfur or oxygen atom with sufficient bonds and substituents to form a heteroaromatic ring and R5 independently represents a hydrogen or a substituent;

each R1, R2, R3, and R4, is independently hydrogen, alkyl or an aryl group;

and Y is a charge balancing anion.

11. The light curable material of claim 10 wherein any two or more R substituents may form a ring.

12. The light curable material of claim 10 wherein Y is a separate moiety or part of an R group.

13. The light curable material of claim 1 wherein the weight ratio of said layered material to said N-oxyazinium photoinitiator is from 80:20 to 60:40.

14. The light curable material of claim 1 wherein said layered material comprises a clay.

15. The light curable material of claim 14 wherein said clay comprises smectite clay.

16. The light curable material of claim 1 wherein said layered material comprises a non-clay.

17. The light curable material of claim 1 wherein said at least one aqueous dispersible polymerizer comprises a compound containing ethylenic unsaturation.

18. The light curable material of claim 1 wherein said at least one aqueous dispersible polymerizer comprises mono- or poly-functional acrylate compounds or combinations thereof.

19. The light curable material of claim 18 wherein said poly-functional acrylate compounds are alkoxylated bisphenol A diacrylates.

20. The light curable material of claim 18 wherein said mono-functional acrylate compounds comprises at least one member selected from the group consisting of hydroxyalkyl acrylates, long- and short-chain alkyl acrylates, aminoalkyl acrylates, alkoxyalkyl acrylates, single and multi-ring cyclic aromatic or non- aromatic acrylates, alcohol-based acrylates, and alkoxylated alkylphenol acrylates.

21. The light curable material of claim 1 wherein said at least one aqueous dispersible polymerizer comprises a polymer.

22. The light curable material of claim 21 wherein said polymer comprises at least one member selected from the group consisting of gelatin, poly(vinyl alcohol), poly(ethylene oxide), polyvinylpyrrolidone, poly(acrylic acid), poly(styrene sulfonic acid), poly(acrylamide), and quaternized polymer.

23. The light curable material of claim 1 further comprising a matrix binder.

24. The light curable material of claim 23 wherein the weight ratio of said splayed layered material to said matrix binder is from 3:97 to 15:85.

25. The light curable material of claim 23 wherein said matrix binder is water soluble.

26. The light curable material of claim 25 wherein said water soluble matrix binder is at least one member selected from the group consisting of gelatin, poly(vinyl alcohol), poly(ethylene oxide), polyvinylpyrrolidone, poly(acrylic acid), poly(styrene sulfonic acid), poly(acrylamide), and quaternized polymer.

27. The light curable material of claim 1 wherein said light curable material a support for an imaging element.

28. The light curable material of claim 1 wherein said light comprises wavelengths from 300-550 nm.

29. The light curable material of claim 28 wherein the source of said light is a high pressure xenon and mercury lamp, a halogen lamp, or a tunable laser.

30. A method for curing a material comprising providing layered material, splaying said layered material, combining said splayed layered material with a polymerizer and an aqueous soluble N-oxyazinium photoinitiator, wherein said aqueous soluble N-oxyazinium photoinitiator is capable of generating a free radical and wherein said splayed layered material comprises a layered material splayed by said aqueous soluble N-oxyazinium photoinitiator, and subjecting said combination to light for a period of time sufficient to effect the polymerization of the polymerizer.

31. The method for curing a material of claim 30 wherein said N-oxyazinium photoinitiator is represented by the following formula I:

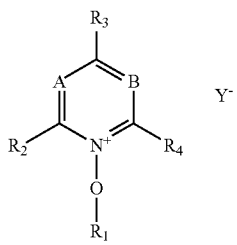

I wherein A and B independently represent a carbon, C—R5, C—R6 or nitrogen; each R1, R2, R3, R4, is independently hydrogen, alkyl or an aryl group; and Y is a charge balancing anion.

32. The method for curing a material of claim 30 wherein said N-oxyazinium photoinitiator is represented by formulas III and IV:

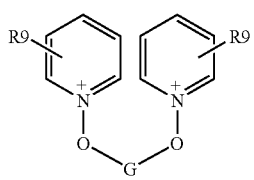

III

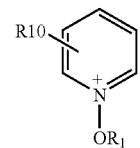

IV wherein R1 is an alkyl, or an aryl;

R10 or R9 are independently a hydrogen atom, alkyl, aryl, heterocyclic, carboxylic, carboxylate, carbonamido, sulfonamido, nitryl, groups, —CO—R11, wherein R11 is an alkyl group or aryl group, or —(CH=CH)m—R12 group, wherein 12 is an aryl or heterocyclic group and m is 1 or 2; and G is an alkylene group.

33. The method for curing a material of claim 30 wherein said N-oxyazinium photoinitiator is represented by the following formula II:

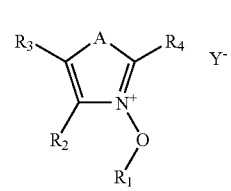

II wherein A represents a carbon, C-R5, nitrogen, sulfur or oxygen atom with sufficient bonds and substituents to form a heteroaromatic ring and R5 independently represents a hydrogen or a substituent;

each R1, R2, R3, and R4, is independently hydrogen, alkyl or an aryl group;

and Y is a charge balancing anion.

34. The method for curing a material of claim 30 wherein said layered material comprises a clay.

35. The method for curing a material of claim 30 wherein said at least one aqueous dispersible polymerizer comprises a compound containing ethylenic unsaturation.

36. The method for curing a material of claim 30 wherein said at least one aqueous dispersible polymerizer comprises mono- or poly-functional acrylate compounds or combinations thereof.

37. The method for curing a material of claim 30 wherein said at least one aqueous dispersible polymerizer comprises a polymer.

38. The method for curing a material of claim 30 wherein said polymer comprises at least one member selected from the group consisting of gelatin, poly(vinyl alcohol), poly(ethylene oxide), polyvinylpyrrolidone, poly(acrylic acid), poly(styrene sulfonic acid), poly(acrylamide), and quaternized polymer.

39. The method for curing a material of claim 30 further comprising adding a matrix binder.

40. The method for curing a material of claim 30 wherein said light comprises wavelengths from 300-550 nm.

41. The method for curing a material of claim 30 further comprising forming the combination into a sheet prior to subjecting said combination to light for a period of time sufficient to effect the desired degree of polymerization of the polymerizer.

42. The method for curing a material of claim 30 further comprising forming the combination into a support prior to subjecting said combination to light for a period of time sufficient to effect the desired degree of polymerization of the polymerizer.

* * * * *